(12) United States Patent
Kim

(10) Patent No.: US 7,556,138 B2
(45) Date of Patent: Jul. 7, 2009

(54) METHOD AND APPARATUS FOR COLLATING NAILS

(76) Inventor: Chi Hyun Kim, 89, Paho Dong, Dalseo Gu, Daegu (KR) 704-220

( * ) Notice: Subject to any disclaimer, the term of this patent is extended or adjusted under 35 U.S.C. 154(b) by 132 days.

(21) Appl. No.: 11/853,055

(22) Filed: Sep. 11, 2007

(65) Prior Publication Data
US 2009/0069102 A1 Mar. 12, 2009

(51) Int. Cl.
*B65B 19/34* (2006.01)
(52) U.S. Cl. ............ 198/408; 198/394; 198/389; 221/173; 206/344; 53/399
(58) Field of Classification Search ............ 198/408, 198/387, 389, 394; 221/173; 206/344; 53/399
See application file for complete search history.

(56) References Cited

U.S. PATENT DOCUMENTS

| | | | | |
|---|---|---|---|---|
| 3,315,436 | A | * | 4/1967 | Mosetich et al. .......... 53/399 |
| 3,563,377 | A | * | 2/1971 | Southcott ................ 209/535 |
| 3,736,198 | A | * | 5/1973 | Leistner ................... 156/65 |
| 3,992,852 | A | * | 11/1976 | Schwarz et al. ........... 53/591 |
| 4,108,299 | A | * | 8/1978 | Mast, Jr. .................. 28/119 |
| 4,174,028 | A | * | 11/1979 | Barnes .................... 198/389 |
| 4,472,956 | A | * | 9/1984 | Leistner ................... 72/92 |
| 4,711,980 | A | | 12/1987 | Leistner |
| 5,058,228 | A | | 10/1991 | Wright et al. |
| 5,140,715 | A | | 8/1992 | Monacelli |
| 5,482,419 | A | | 1/1996 | Leistner |

FOREIGN PATENT DOCUMENTS

JP          62100318 A  *  5/1987  .............. 198/387

* cited by examiner

*Primary Examiner*—Mark A Deuble
(74) *Attorney, Agent, or Firm*—Sand & Sebolt

(57) ABSTRACT

An apparatus and method for collating nails wherein round head nails are fed by gravity along an inclined rail to a periphery of a rotating indexing and feed wheel. The nails are deposited into circumferentially spaced grooves formed in the periphery of the feed wheel in a vertical orientation. The feed wheel is inclined at an angle of approximately 45° and upon 180° rotation of the feed wheel the nails assume a horizontal orientation. A conveyor has a plurality of spaced segments attached to a pair of moving belts. Each segment is formed with spaced notches for receiving the nails in a horizontal spaced relationship from the feed wheel and then transporting the horizontally spaced nails to a collator for forming into a continuous strip. Rotation of the feed wheel is synchronized with movement of the conveyor by a motor, a gear train and drive shafts extending between the feed wheel and conveyor.

21 Claims, 11 Drawing Sheets

METHOD AND APPARATUS FOR COLLATING NAILS

BACKGROUND OF THE INVENTION

1. Technical Field

The invention relates to collating nails, and in particular to a method for collating full round head nails with increased speed by use of a gear driven inclined feed wheel synchronized with a moving conveyor wherein the feed wheel receives the nails in a vertical orientation and delivers them onto the conveyor in a horizontal orientation.

2. Background Information

Collated nails are used in many industrial nailing applications wherein the nails are secured in a continuous web or belt-like condition for automatically feeding the nails into a power driven nailer. These nails are secured in the web by various mechanisms such as welding of a small wire to the spaced nails, connection by hot melt adhesive strips or other substrates for holding the nails in a secure continuously spaced condition along the substrate or feed web.

Various mechanisms are used to arrange the nails in a spaced parallel relationship for subsequent collating onto a supporting substrate or web by various types of apparatus such as shown in U.S. Pat. Nos. 5,058,228, 5,140,715 and 4,711,980. Some of these prior art apparatus use a type of indexing and delivery mechanism wherein the nails are fed to a supporting conveyor by an indexing and feed wheel such as shown in U.S. Pat. No. 5,058,228. However, these devices are used most efficiently with nails having non-rounded heads such as those having a D-shaped head or clipped head, such as shown in the above-referenced U.S. Pat. No. 5,058,228. It has been found difficult to be able to supply and arrange a plurality of round headed nails by the use of such mechanism with sufficient speed to be utilized with a nail collator due to the spacing required between the round headed nails and movement thereof into the spaced parallel relationship required for subsequent bonding to a supporting substrate or web.

BRIEF SUMMARY OF THE INVENTION

The present invention provides an apparatus for rapidly indexing and feeding a plurality of nails in a spaced horizontal relationship to a collator for subsequent collating into a strip of nails secured to a substrate or supporting web at an increased speed than heretofore believed possible with existing collators for round headed nails.

Another feature is to provide such an apparatus in which the indexing and feed wheel is at an inclined angle with respect to the horizontal and vertical, preferably at an angle of approximately 45°, wherein the nails are delivered to the feed wheel from a nail feed device in a generally vertical orientation, and upon 180° rotation of the feed wheel, deposits the nails in a spaced horizontal orientation onto an adjacent moving conveyor for subsequent delivery to a nail collator.

A further aspect of the present invention is to provide the delivery conveyor with a power drive motor which is synchronized through a gear train to the inclined rotatable indexing and feed wheel to correlate the speed of both pieces of apparatus to each other to ensure proper delivery and spacing of the nails onto the moving conveyor.

A further feature of the present invention is to provide such an apparatus which uses a plurality of L-shaped segments which are attached to a moving belt of the conveyor, each of which is formed with a series of spaced notches or grooves which align with the notches or grooves of adjacent segments for receiving the nails in a parallel relationship, wherein the shanks of the nails are angled slightly with respect to the longitudinal axis of the conveyor in order to assist in providing the increased speed of the indexing and feed wheel and proper angular orientation of the nails for subsequent collation.

These objectives and advantages are achieved by the improved apparatus of the present invention used for collating nails having a rounded head and a shank, the general nature of which may be stated as including a nail feed mechanism for orienting and feeding a plurality of said nails with their heads in proper orientation; a nail indexing and feed wheel receiving said nails from the nail feed mechanism and indexing the nails into a plurality of circumferential spaced grooves formed in the wheel for orienting the nail shanks in a generally vertical orientation; a drive mechanism for rotating the nail indexing and feed wheel for orienting the nail shanks in a horizontal orientation after 180° of rotation; a conveyor for receiving the nails from the nail indexing and feed wheel in the horizontal orientation and for placing said nails in a horizontal spaced relationship and conveying said nails away from said wheel; and a collating station in communication with the conveyor for collating the nails to form a continuous strip.

These objectives and features are further obtained by the improved method of the present invention for arranging a plurality of nails for subsequent collating into a continuous strip, the general nature of which may be stated as including the steps of providing a nail indexing and feed wheel having a plurality of circumferentially spaced peripheral grooves; feeding a plurality of nails having a vertical orientation into the spaced peripheral grooves of the nail indexing and feed wheel; rotating said nail indexing and feed wheel in an inclined plane whereupon each of the nails moves from vertical orientation to horizontal orientation after approximately 180° rotation of said indexing and feed wheel; and depositing said nails in the horizontal orientation into spaced grooves of a conveyor.

BRIEF DESCRIPTION OF THE SEVERAL VIEWS OF THE DRAWINGS

A preferred embodiment of the invention, illustrated of the best mode in which Applicant contemplates applying the principles, is set forth in the following description and is shown in the drawings and is particularly and distinctly pointed out and set forth in the appended claims.

Similar numbers refer to similar parts throughout the drawings.

DETAILED DESCRIPTION OF THE INVENTION

Figure 1:
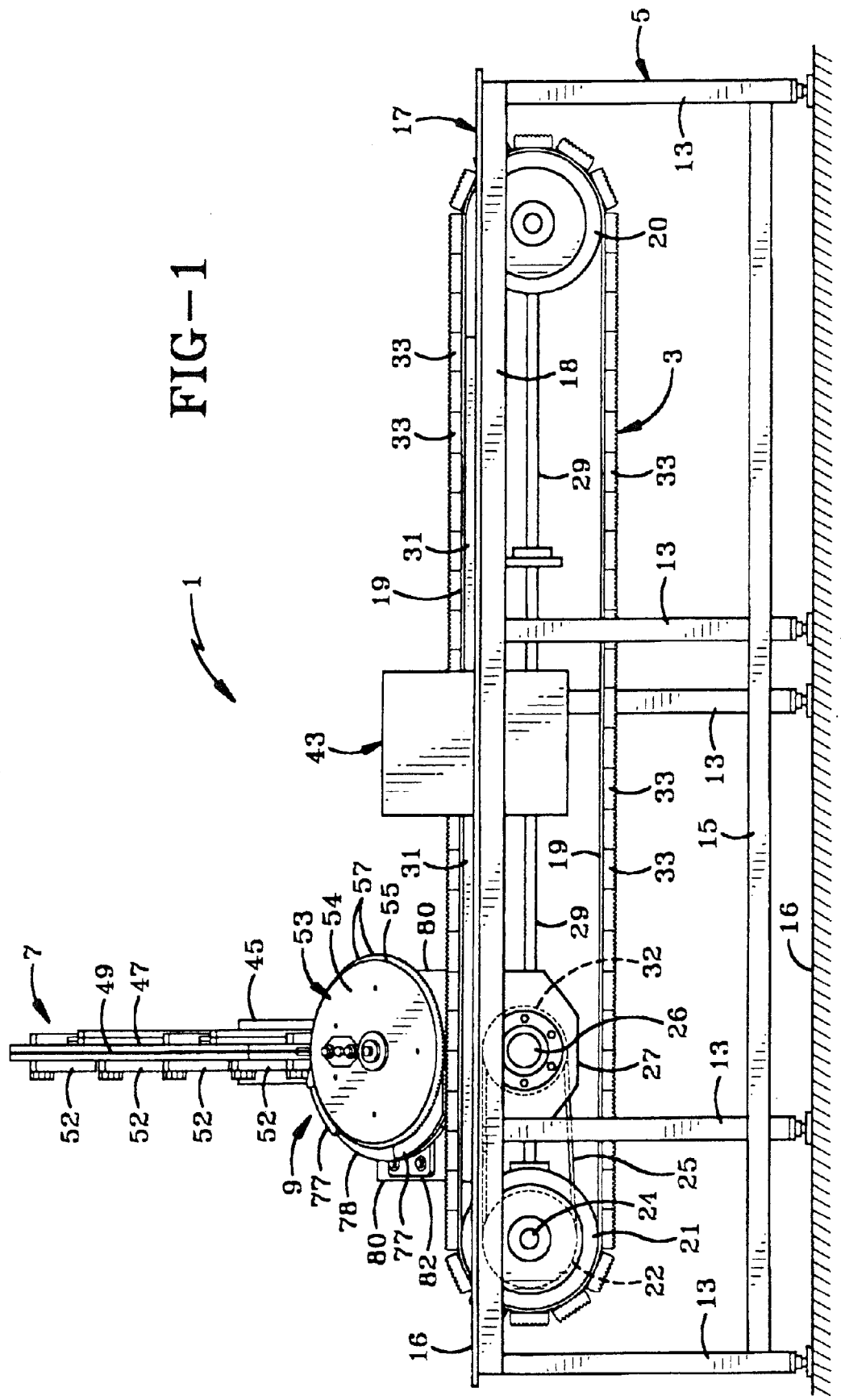
FIG. 1 is a side elevational view of the apparatus of the present invention for practicing the method of collating nails.
Figure 2:
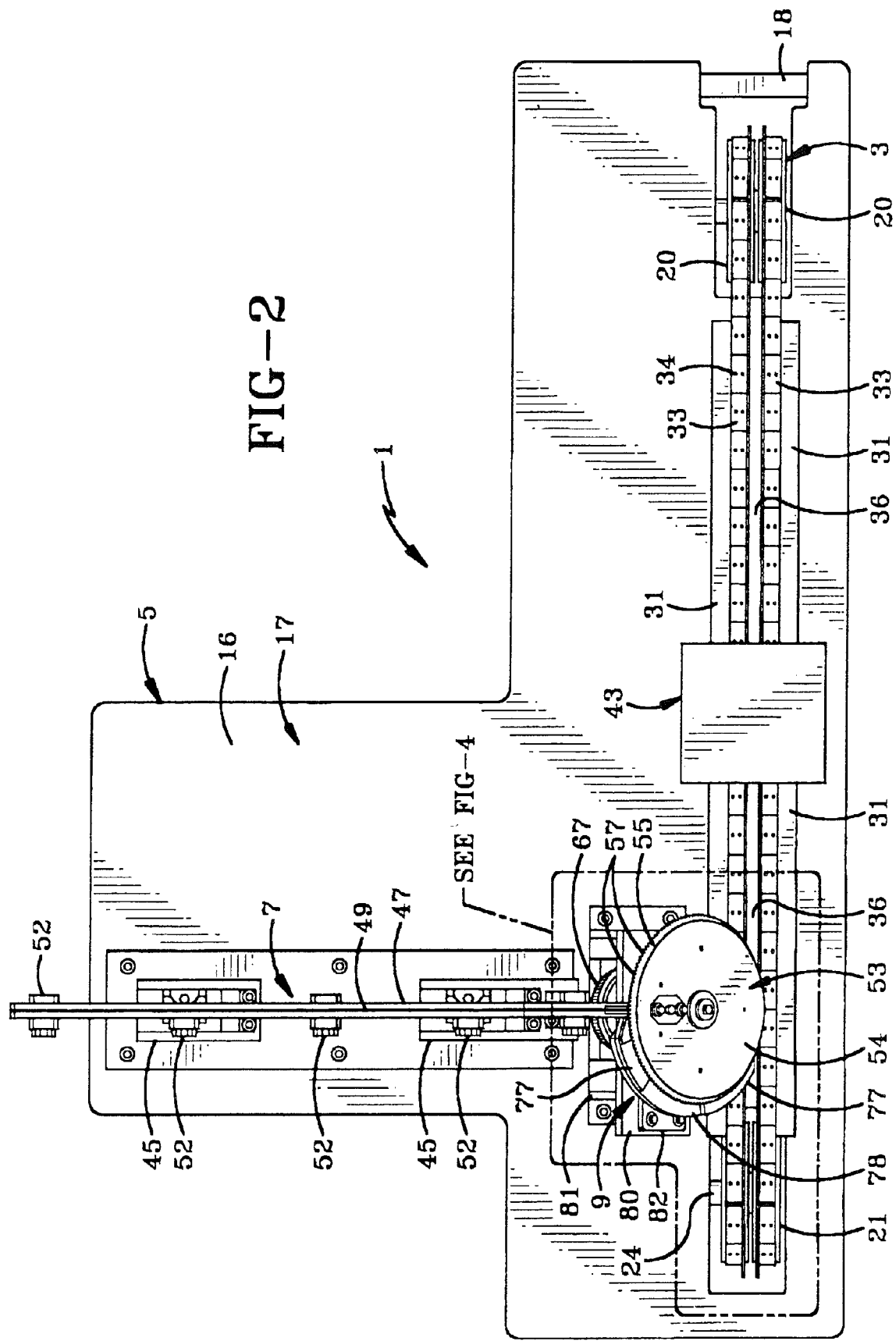
FIG. 2 is a top plan view of FIG. 1.

FIG. 1 is a side elevational view of the improved apparatus of the present invention and is indicated generally at 1. Apparatus 1 includes a conveyor indicated generally at 3, which is mounted on a supporting structure indicated generally at 5. Apparatus 1 further includes a nail feed mechanism indicated generally at 7, which supplies a plurality of nails to a nail indexing and feed wheel indicated generally at 9. Feed mechanism 9 is drivingly connected in synchronization with conveyor 3 by a gear train 11. Support structure 5 includes a plurality of vertical and horizontal frame members 13 and 15 respectively, and is adapted to rest upon a supporting surface 16.

Conveyor 3 is mounted in a horizontal planar table top 17, which is supported on an upper horizontal frame member 18. Conveyor 3 may have various configurations, with a preferred type being shown in the drawings. Conveyor 3 includes a pair of spaced continuous belts 19 which extend about a pair of drive wheels 20 and 21. A drive motor 26 is mounted to the bottom of table top 17 by a support bracket 27 (FIG. 5) and is connected to a drive wheel 32 by a drive shaft 28. Drive wheel 32 is connected by a drive belt 25 to conveyor drive pulley 22 which is connected to drive wheel 21. A bevel gear 23 is attached to drive pulley 22 (FIG. 3) which drives a gear 30 which is attached to a shaft 29 which extends longitudinally beneath table top 17 as shown in FIG. 1 for drivingly connecting conveyor belt drive wheels 20 and 21 in synchronization to motor 26. Conveyor 3 preferably includes a pair of glide surfaces 31 which may be formed of plastic strips, over which belts 19 slide to reduce the sliding friction of the belts as they move along table top 17.

Figure 12:
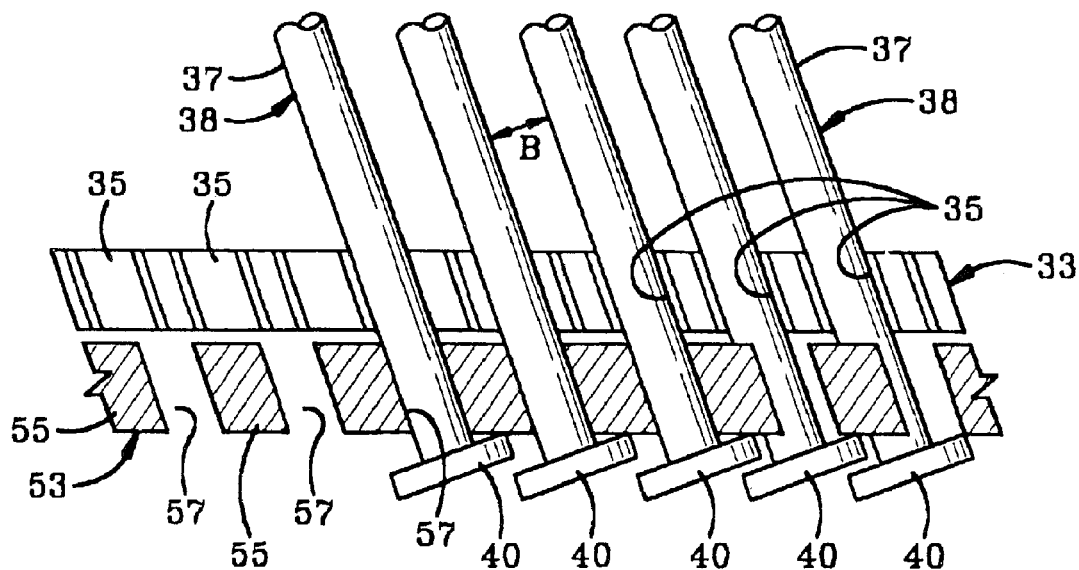
FIG. 12 is an enlarged fragmentary sectional view taken on line 12-12, FIG. 10.
Figure 13:
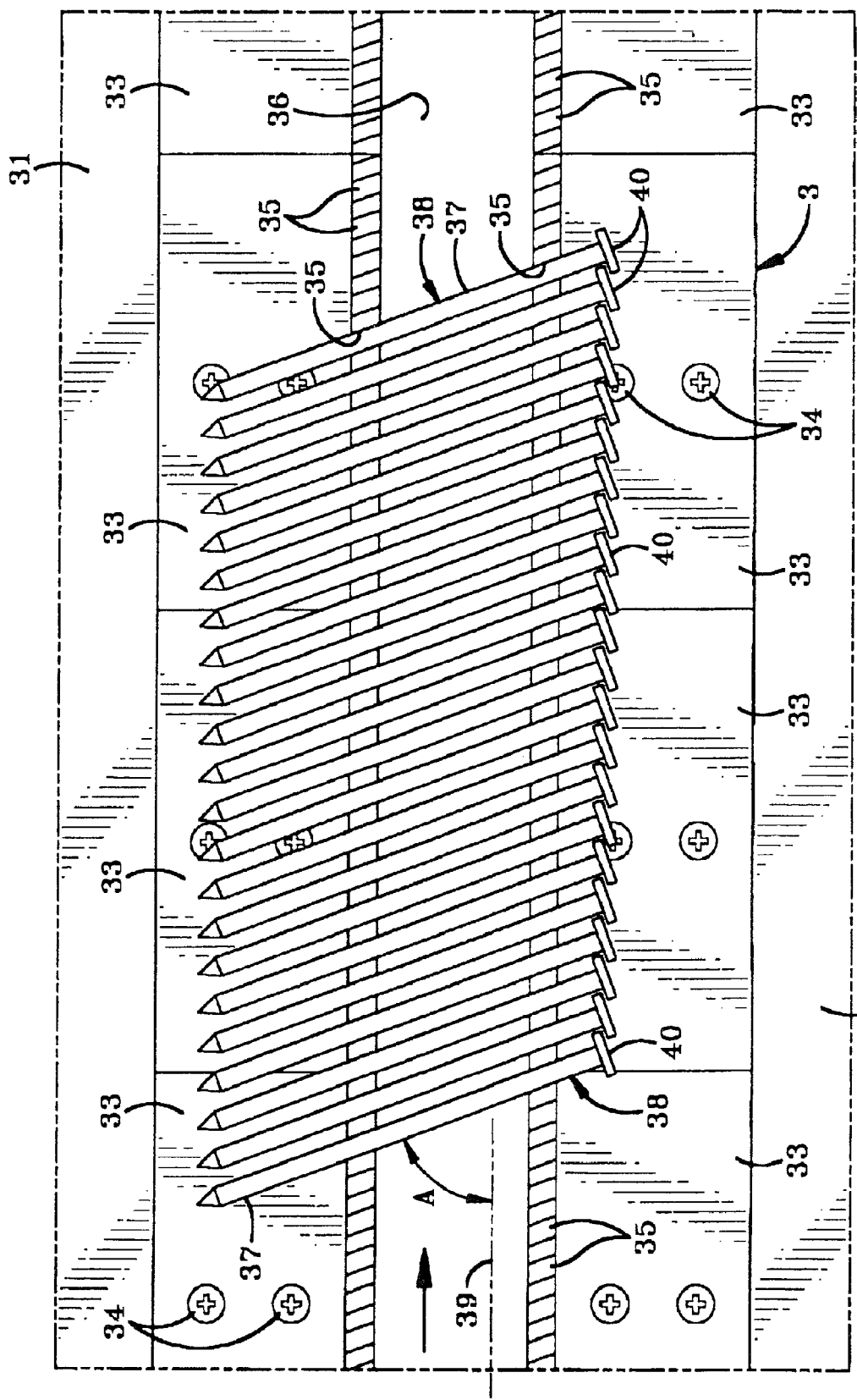
FIG. 13 is an enlarged fragmentary sectional view showing a plurality of nails being transferred along the conveyor toward the collator.

In accordance with one of the features of the invention, a plurality of L-shaped segments 33 (FIGS. 4, 5, 11 and 13) are mounted by a plurality of fasteners 34 along the length of belts 19 with each of the segments being formed with a series of top grooves or notches 35, which are sized to closely correspond to the diameter of shanks 37 of nails 38 which are intended to be collated by apparatus 1. Segments 33 are separated by a space 36 (FIG. 11) which provides clearance for a collator 43 located downstream from feed mechanism 7. Notches 35 of L-shaped segments 33 are slightly angled as shown in FIGS. 12 and 13 so that when nails 38 are received therein (FIG. 13), they extend at an acute angle A with respect to the longitudinal axis 39 of conveyor belt 3 enabling the nail heads 40 to lie in generally overlapping relationship as shown in FIGS. 12 and 13, so that shanks 37 have the desired spacing B (FIG. 12) for subsequent collating into a strip 41 (FIG. 14) for use in the intended nail gun. It is readily understood that other types of conveyor mechanisms could be utilized although the particular embodiment described above and shown in the drawings containing the L-shaped segments 33 having their unique angled groove arrangements formed therein, have proved satisfactory for properly receiving the nails as they are discharged from indexing and feed mechanism 9 for subsequent delivery to collator 43.

Figure 7:
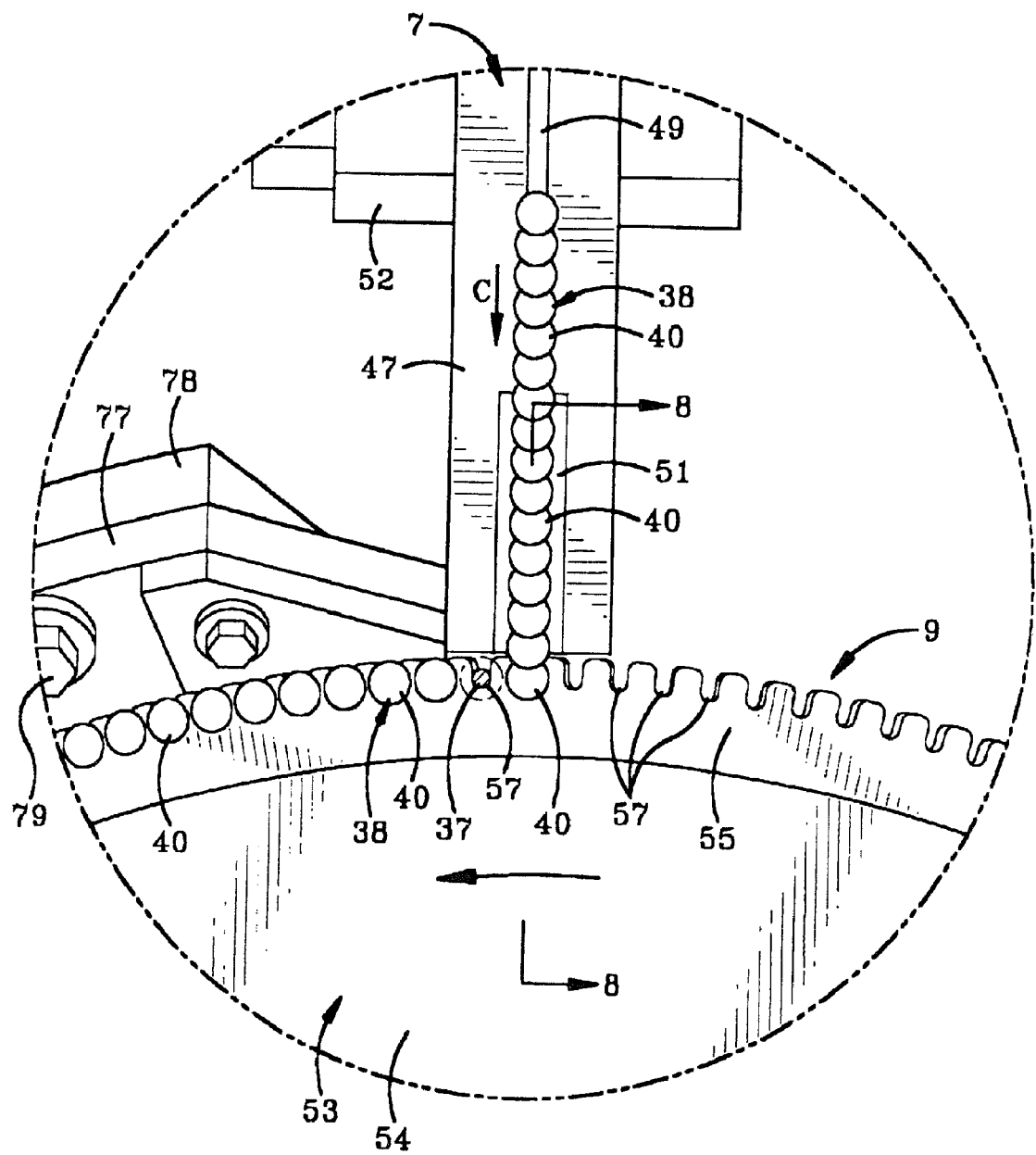
FIG. 7 is a greatly enlarged fragmentary view showing the nails being fed from the nail feed rail into the spaced grooves of the nail indexing and feed wheel.
Figure 8:
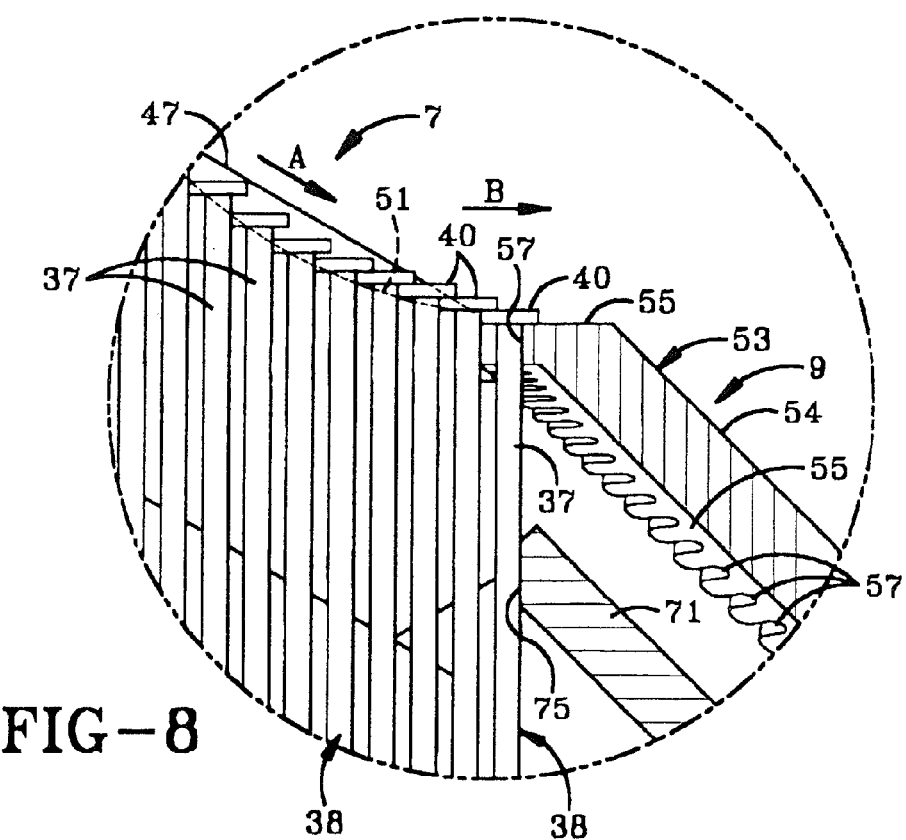
FIG. 8 is an enlarged fragmentary side elevational view showing the nails being fed from the nail feed rail into the spaced grooves of the nail indexing and feed wheel as shown in FIG. 7.

Nail feed mechanism 7 includes a pair of vertical support columns 45 (FIG. 3) on which is adjustably mounted an inclined feed rail 47 which is formed with a slot 49 (FIG. 7) which is sized complementary to nail shanks 37 to slidably receive the nail shanks therethrough, but sized to prevent the passage of nail heads 40. The lower end of feed rail 47 is formed with a guide surface 51, which is shown in FIGS. 7 and 8, to provide a gradual transition for the nails to move from the inclined feed position into a horizontal feed position as shown by Arrows A and B (FIG. 8) immediately adjacent feed mechanism 9. Feed rail 47 is adjustably mounted on the top of each vertical support 45 by a pair of adjustment brackets 52 for adjusting the width of slot 49.

Figure 9:
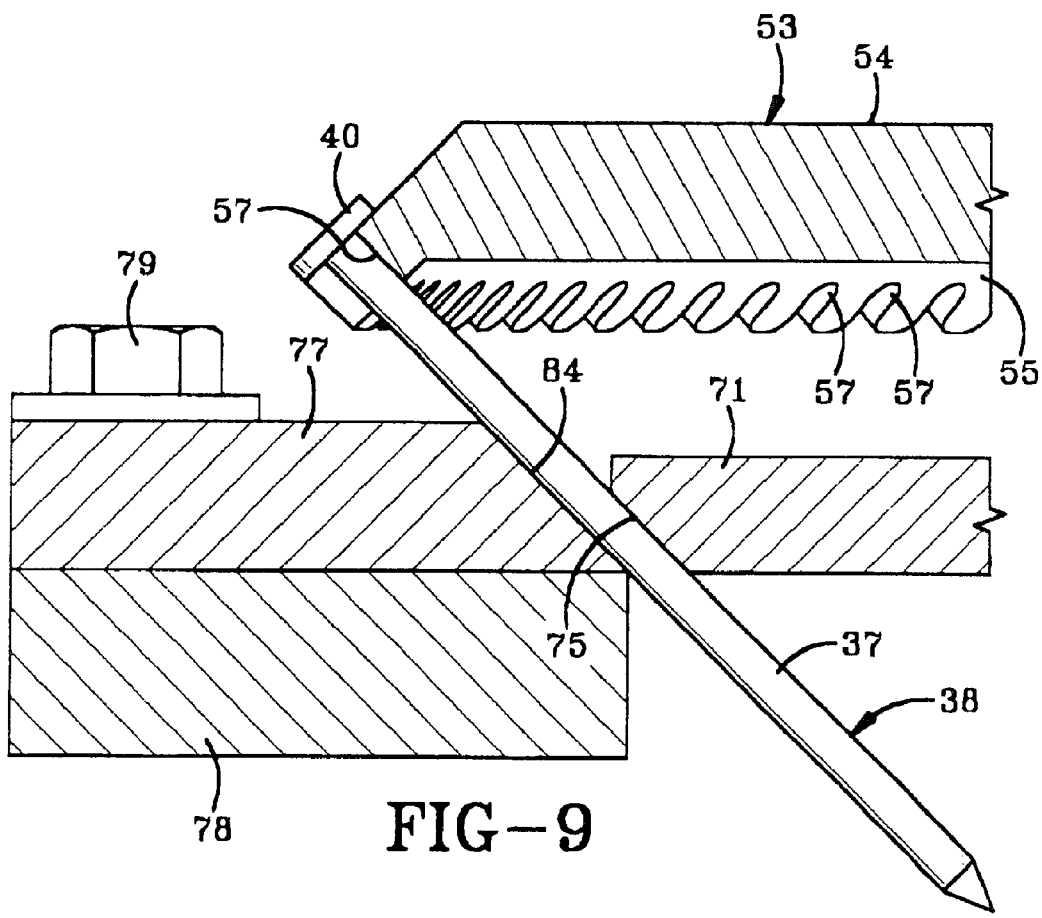
FIG. 9 is an enlarged fragmentary sectional view taken on line 9-9, FIG. 4.

Nail indexing and feed mechanism 9 includes a main feed wheel indicated generally at 53, which has a generally planar top surface 54 and an outer periphery 55. Outer periphery 55 is formed with a series of circumferentially spaced nail-receiving grooves 57 (FIG. 7) which transfer the nails in a predetermined spaced relationship from guide surface 51 of feed rail 47 into notches 35 of L-shaped segments 33 as discussed further below. Wheel grooves 57 are slightly angled with respect to the axis of rotation of the feed wheel as shown in FIGS. 9 and 12. Feed wheel 53 is secured to a shaft 59 (FIG. 5) by an attachment bolt 61 or other type of fastening arrangement. Shaft 59 is rotatably supported in a pair of spaced bearings 63 which are mounted on a support 65 (FIG. 3) which is mounted on a plate 80 by bolts 66. Gear train 11 includes a first bevel gear 67 which is mounted on an inner end of shaft 59 and is meshingly engaged with a second bevel gear 69 mounted on drive motor shaft 28 for rotating shaft 59 and correspondingly feed wheel 53 in synchronization with the driving of conveyor 3, and in particular with conveyor belts 19. This enables the coordination, synchronization and positioning of conveyor notches 35 with feed wheel grooves 57 so that nails 38 leave guide surface 51 in proper alignment with a nail-receiving groove 57 as shown in FIGS. 7 and 8 for discharging each of the nails into a respective one of the nail-receiving grooves 57 of feed wheel 53 and then into the longitudinally moving conveyor notches 35.

Thus, rotation of drive shaft 28 by motor 26 moves drive belts 19 at a controlled speed through wheel 21 which is driven by motor 26, drive shaft 28, drive wheel 32 and drive belt 25, as well as coordinating the rotational speed of conveyor wheel 20 through connecting shaft 29. Furthermore, bevel gears 67 and 69 coordinate the rotational speed of drive shaft 28 with that of feed wheel shaft 59 which ensures the proper alignment of nail-receiving grooves 57 with guide surface 51 at the output of feed rail 47, together with notches 35 of the L-shaped support segments 33.

Figure 3:
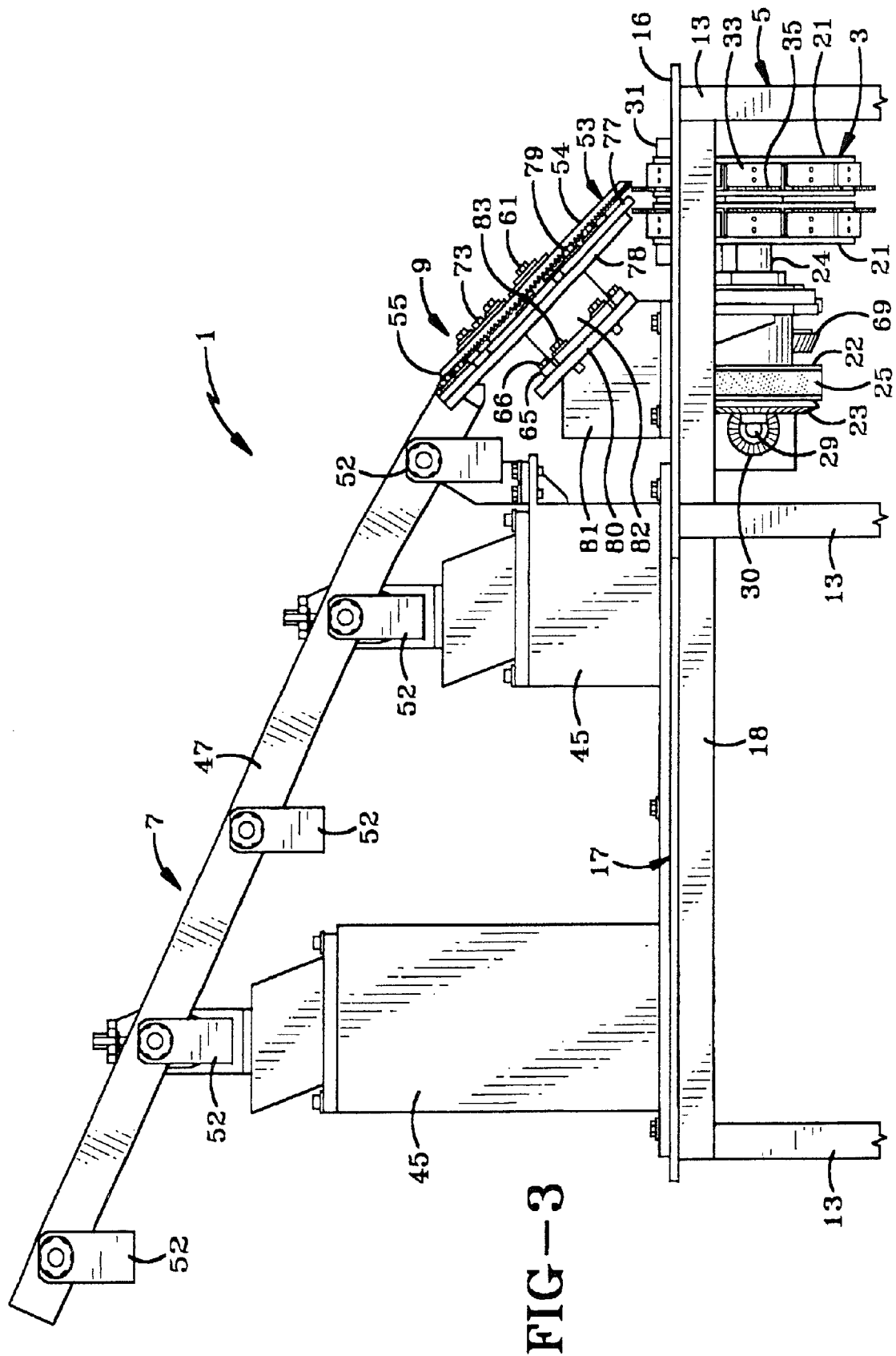
FIG. 3 is a side elevational view of the apparatus of FIGS. 1 and 2.
Figure 4:
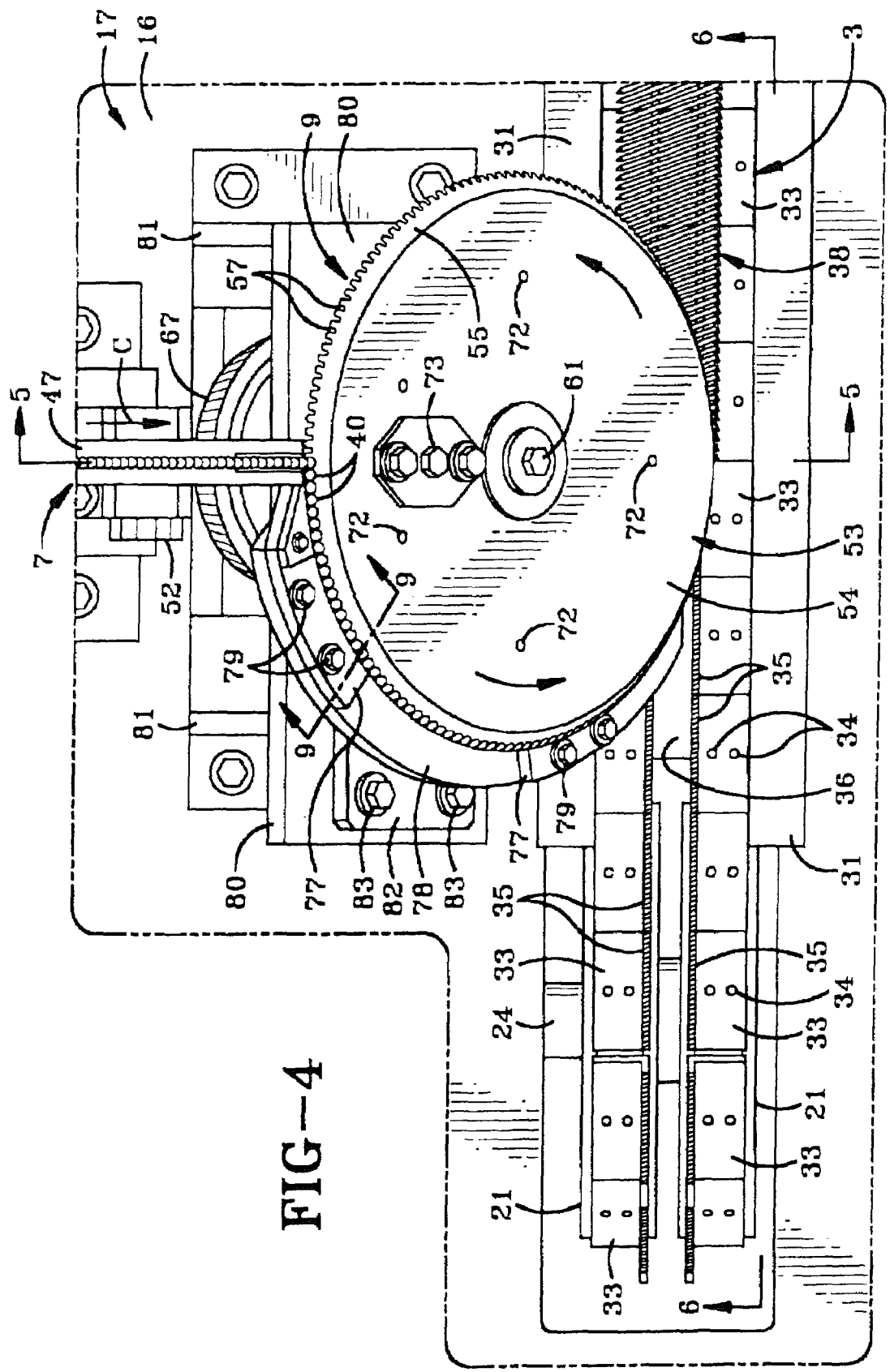
FIG. 4 is an enlarged view of the encircled portion of FIG. 2.

A circular alignment plate 71 is mounted on the bottom surface of feed wheel 53 by a plurality of fasteners 72 and a positioning post 73. Plate 71 is formed with an angled outer peripheral edge 75 for engaging nail shafts 37 placing them in a proper position for placement into wheel grooves 57 (FIG. 8) and into notches 35 of conveyor transport segments 33 (FIG. 11) as discussed further below. A pair of arcuate guide segments 77 are mounted on a plate 78 by a plurality of fasteners 79. Plate 78 is attached to a mounting plate 82 by welding or other attachment means and to a main mounting plate 80 by bolts 83 (FIGS. 3 and 4). Vertical support bracket 81 for mounting plate 80 is secured to and extends upwardly from table top 17. Guide segments 77 have inner arcuate guide surfaces 84 (FIG. 9) which are located closely adjacent to outer periphery 55 of feed wheel 53 and peripheral edge 75 of plate 71 to maintain nails 38 in their proper position and orientation to maintain the nails within feed wheel grooves 57 until being transferred into notches 35 of segments 33.

Figure 5:
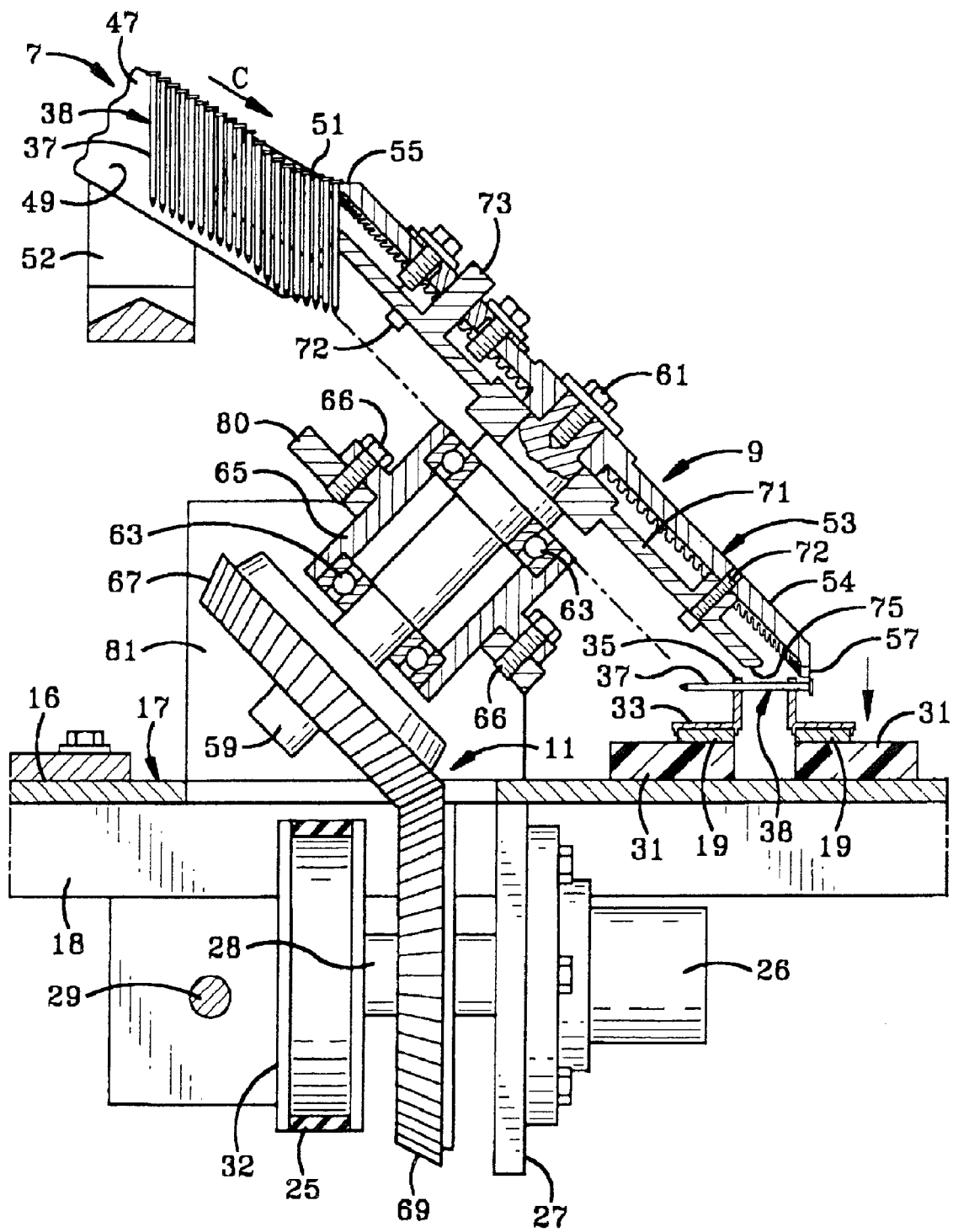
FIG. 5 is a sectional elevational view taken on line 5-5, FIG. 4.
Figure 6:
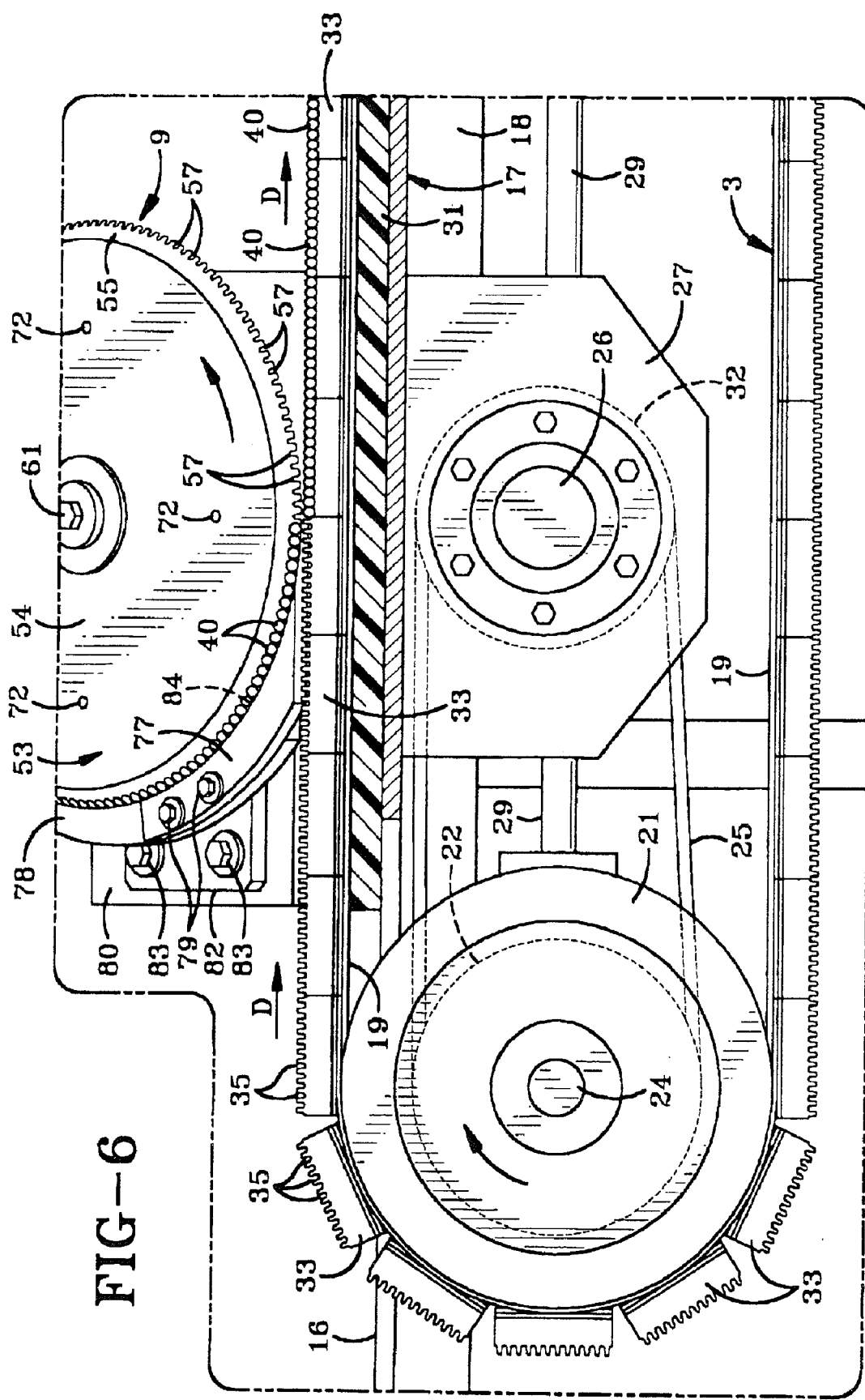
FIG. 6 is a fragmentary sectional view taken on line 6-6, FIG. 4.

Thus, when carrying out the method steps of the invention, a plurality of nails 38 move along slot 49 of feed rail 47 in an inclined direction as shown by Arrow C in FIG. 5 until reaching guide surface 51 where they move in a generally horizontal direction as shown by Arrow B in FIG. 8 and are automatically deposited into the adjacent groove 57 formed in the periphery of feed wheel 53 as shown in FIGS. 7, 8 and 9. When the nails are placed in grooves 57, they are at a generally angled position with respect to the periphery of feed wheel 53 and extend in a generally vertical relationship as shown in FIG. 8 and are maintained in the desired position by engagement with surface 75 of alignment plate 71 and guide surface 84 (FIG. 9) of guide segment 77 throughout a generally 180° rotation of feed wheel 53. This 180° rotation reorients the nails from their horizontal initial position of FIG. 8 to a generally horizontal discharge position as shown in FIG. 11 where the nails fall by gravity into notches 35 formed in the top edges of support segments 33 which are moving in a linear direction as shown by Arrow D, FIG. 6 until reaching collator 43 (FIG. 1).

Figure 10:
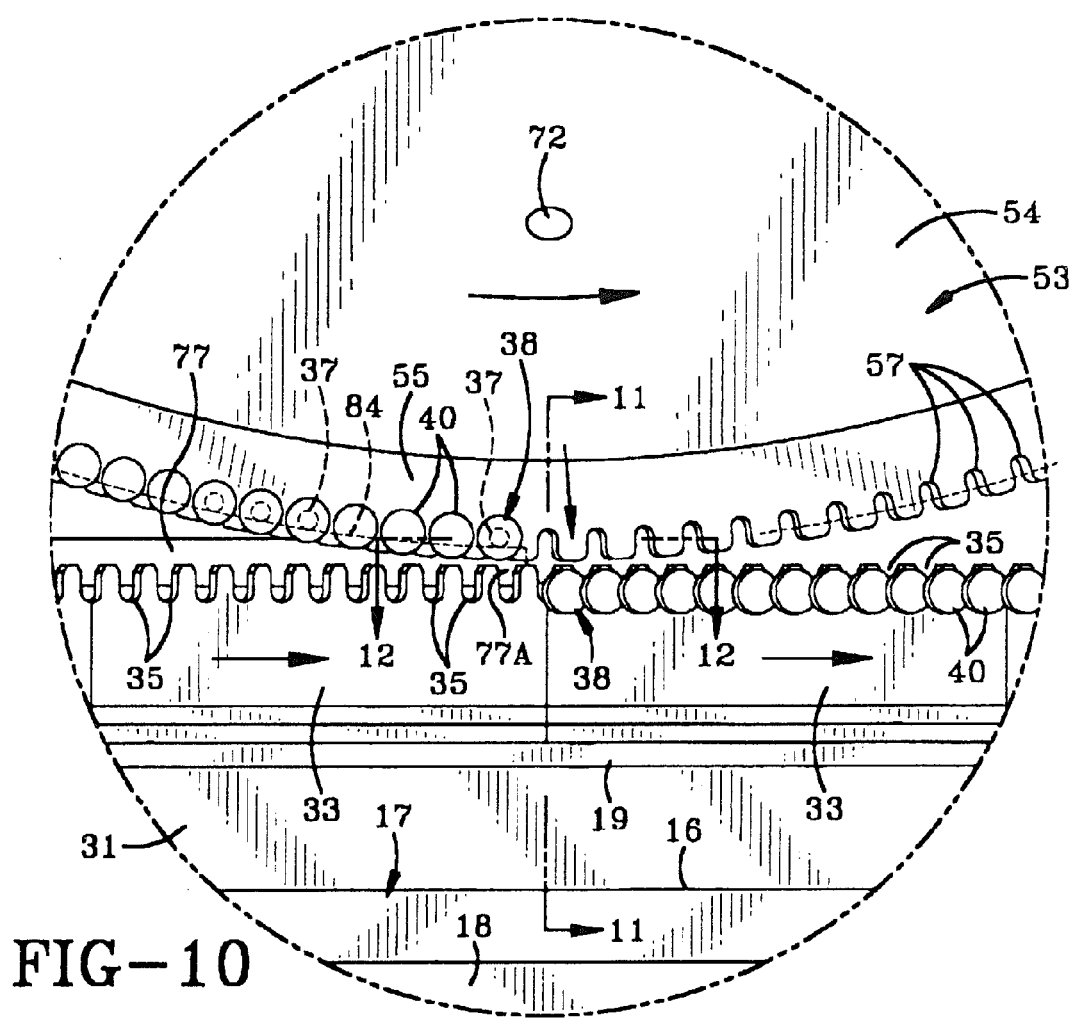
FIG. 10 is a greatly enlarged fragmentary view showing the nails being transferred from the peripheral grooves of the indexing and feed wheel into the grooves of the support segments of the conveyor.
Figure 14:
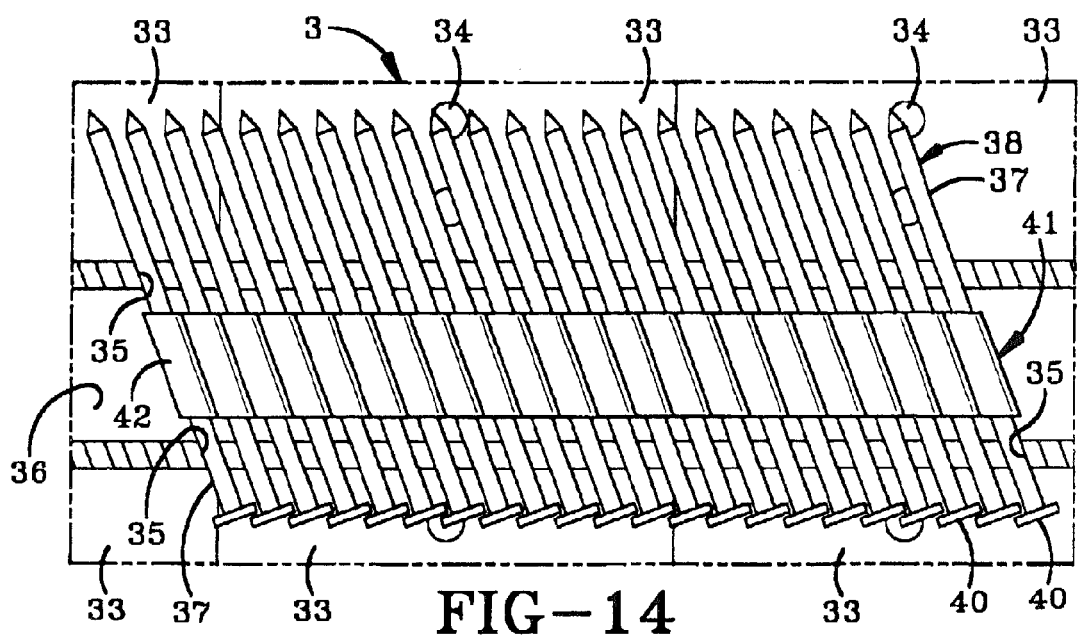
FIG. 14 is a fragmentary top plan view of a strip of the collated nails.

Nail shanks 37 ride along surface 77 until they get past end 77A thereof (FIG. 10) where they drop by gravity into notches 35. At collator 43, the nails are formed into a collated strip 41 as shown in FIG. 14, by the use of a continuous web 42 or other type of substrate or fasteners well-known in the nail collating art. The collated nails then continue along conveyor 3 until they are discharged into a chute, collection box or other transfer mechanism at the end of the conveyor for subsequent packing and shipment.

Figure 11:
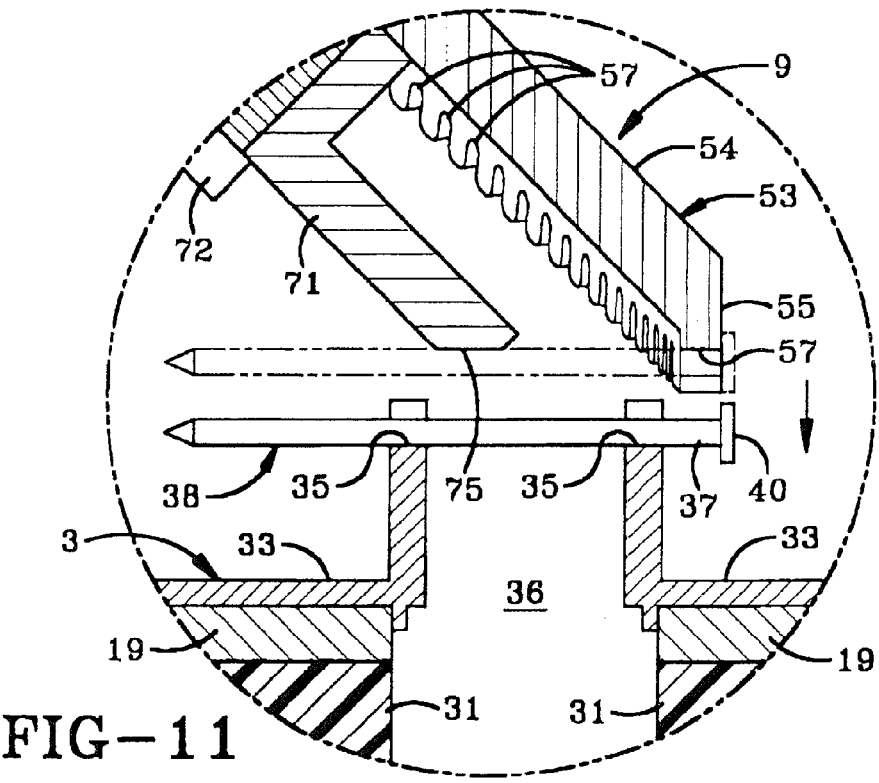
FIG. 11 is an enlarged fragmentary sectional view taken on line 11-11, FIG. 10.

In accordance with one of the main features of the invention, the mounting of feed wheel 53 at an inclined angle, preferably at an angle of approximately 45° with respect to the vertical and horizontal, together with the inclined feeding of the nails into the nail receiving grooves 57 at the upper end of the feed wheel as shown in FIG. 5 wherein the nails are received in a vertical relationship and then reoriented to a horizontal orientation after rotation of the wheel through 180°, the nails are deposited automatically by gravity from notches 57 at the bottom of the inclined wheel into adjacent notches 35 as shown in FIG. 11 for continued movement along conveyor 3 to collator 43. The synchronization of the rotation of feed wheel 55 together with the positioning of receiving notches 35 is critical and is achieved by the interconnection of the drive shaft for feed wheel 55 with the movement of conveyor 3 through gear train 11, as well as the accurate spacing of segments 33 on conveyor 3. This coordinated movement of feed wheel 53 with the movement of nail receiving segments 33 has enabled a rate of nail delivery of approximately 3000 nails per minute, higher than believed possible with existing nail feed and collating types of apparatus.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

The invention claimed is:

1. An apparatus for collating nails, each having a head and a shank, said apparatus comprising:

a nail feed mechanism for orienting and feeding a plurality of said nails with their heads in proper orientation;

a nail indexing and feed wheel receiving said nails from the nail feed mechanism and indexing the nails into a plurality of circumferential spaced grooves formed in the wheel for orienting the nail shanks in a generally vertical orientation;

a drive mechanism for rotating the nail indexing and feed wheel for orienting the nail shanks in a horizontal orientation after 180° of rotation;

a conveyor for receiving the nails from the nail indexing and feed wheel in the horizontal orientation and for placing said nails in a horizontal spaced relationship and conveying said nails away from said wheel; and a collating station in communication with the conveyor for collating the nails to form a continuous strip.

2. The apparatus defined in claim 1 wherein the conveyor moves in a generally horizontal plane; and in which the nail indexing and feed wheel rotates in a plane inclined at an angle of approximately 45° with respect to the plane of the conveyor.

3. The apparatus defined in claim 1 wherein the conveyor includes a pair of spaced rails formed with aligned notches for receiving the nails therein and supporting said nails in the spaced horizontal orientation.

4. The apparatus defined in claim 3 wherein the spaced rails are formed by a plurality of L-shaped segments attached in a spaced relationship on a belt moveable between the nail indexing and feed wheel and the collating station.

5. The apparatus defined in claim 4 wherein the belt includes a pair of belt strips which extend about a pair of spaced wheels; and in which at least one of said wheels is power driven.

6. The apparatus defined in claim 3 wherein the rail notches are aligned in an offset relationship whereby the nail shanks extend at an angle to a longitudinal axis of the conveyor when supported in the horizontal orientation by a pair of said notches.

7. The apparatus defined in claim 1 wherein the nail feed mechanism includes an inclined feed rail having a slot sized to slidably receive the shanks of the nails therethrough while preventing passage of the nail heads therethrough.

8. The apparatus defined in claim 7 wherein the nail feed rail terminates in a guide plate adjacent the periphery of the nail indexing and feed wheel for directing the movement of the nails in a generally horizontal direction.

9. The apparatus defined in claim 1 wherein the nail indexing and feed wheel includes a wheel having a circular outer periphery formed with the plurality of circumferentially spaced grooves adapted to receive the nails therein; in which the wheel is rotatably mounted on a shaft supported by bearings; and in which the drive mechanism includes a drive motor operatively connected to the shaft by a gear for rotating the shaft and wheel.

10. The apparatus defined in claim 9 wherein the gear is a pair of bevel gears, one of said gears being attached to the shaft with the other of said gears being attached to the drive motor.

11. The apparatus defined in claim 9 wherein the grooves of the feed wheel are angled with respect to a rotational axis of said wheel.

12. A method for arranging a plurality of nails for subsequent collating into a continuous strip including the steps of:

providing a nail indexing and feed wheel having a plurality of circumferentially spaced peripheral grooves;

feeding a plurality of nails having a vertical orientation into the spaced peripheral grooves of the nail indexing and feed wheel;

rotating said nail indexing and feed wheel in an inclined plane whereupon each of the nails moves from vertical orientation to horizontal orientation after approximately 180° rotation of said indexing and feed wheel; and depositing said nails in the horizontal orientation into spaced notches of a conveyor.

13. The method defined in claim 12 wherein the step of feeding the nails includes the steps of aligning heads of the nails in a partial overlapping relationship and the shanks of the nails in parallel relationship and moving said nails in an inclined direction toward the indexing and feed wheel; and then moving the nails in a generally horizontal direction adjacent the peripheral grooves of the indexing and feed wheel.

14. The method defined in claim 12 including the step of providing a plurality of spaced segments on the conveyor having the spaced notches formed therein; and aligning the nails in an angled relationship to a longitudinal axis of the conveyor.

15. The method defined in claim 13 including the step of feeding the nails by gravity in the inclined direction toward the indexing and feed wheel.

16. The method defined in claim 12 including the steps of driving the conveyor along a generally horizontal path toward a collator; and collating the nails into a continuous strip.

17. The method defined in claim 16 including the step of driving the conveyor by a drive motor; and synchronizing the driving of the conveyor with the step of rotating the nail indexing and feed wheel.

18. In combination an apparatus for collating nails wherein each of the nails have a disc-shaped head and a shank comprising:

a nail feed mechanism for orienting and feeding a plurality of said nails with their heads in proper orientation;

a feed wheel receiving said nails from the nail feed mechanism and indexing the nails into a plurality of circumferential spaced grooves formed in the wheel, said feed wheel being inclined at an acute angle between horizontal and vertical;

a drive mechanism for rotating the feed wheel whereupon the shanks of said nails move from a generally vertical position to a horizontal position;

a conveyor for receiving the nails from the feed wheel in the horizontal position; and a collating station in communication with the conveyor for collating the nails to form a continuous strip.

19. The combination defined in claim 18 wherein the conveyor moves in a generally horizontal plane; and in which the nail feed wheel rotates in a plane inclined at an angle of approximately 45° with respect to the plane of the conveyor.

20. The combination defined in claim 18 wherein the conveyor includes a pair of belts and a plurality of spaced segments attached to each of the belts, each segment formed with a plurality of notches for receiving and supporting the nails, wherein the shanks of the nails are in a spaced horizontal parallel relationship.

21. The combination defined in claim 18 including a drive motor and a gear train for moving the conveyor and rotating the feed wheel in synchronization.

* * * * *